United States Patent
Suma (10) Patent No.: US 10,641,336 B2
(45) Date of Patent: May 5, 2020

(54) WHEEL BEARING APPARATUS

(71) Applicant: NTN Corporation, Osaka (JP)

(72) Inventor: Hiroto Suma, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 15/933,467

(22) Filed: Mar. 23, 2018

(65) Prior Publication Data

US 2018/0209482 A1 Jul. 26, 2018

Related U.S. Application Data

(63) Continuation of application No. PCT/JP2016/077929, filed on Sep. 23, 2016.

(30) Foreign Application Priority Data

Sep. 25, 2015 (JP) .................. 2015-188613

(51) Int. Cl.
*F16C 33/78* (2006.01)
*F16C 19/18* (2006.01)
(Continued)

(52) U.S. Cl.
CPC .......... *F16C 33/7833* (2013.01); *B60B 35/02* (2013.01); *F16C 19/186* (2013.01);
(Continued)

(58) Field of Classification Search
CPC .... F16C 19/186; F16C 41/007; F16C 33/723; F16C 33/768; F16C 33/783;
(Continued)

(56) References Cited

U.S. PATENT DOCUMENTS 8,393,795 B2 * 3/2013 Aritake .............. F16C 41/007
384/489
9,056,523 B2 * 6/2015 Norimatsu .......... B60B 27/0068
2013/0195389 A1 8/2013 Seki et al.

FOREIGN PATENT DOCUMENTS

EP           2829755 B1 * 10/2018 ............. B60B 35/02
JP       2003-082445      3/2003
(Continued)

OTHER PUBLICATIONS

Japanese Office Action (with English translation) dated Jun. 10, 2019 in corresponding Japanese Application No. 2015-188613.

*Primary Examiner* — Marcus Charles
(74) *Attorney, Agent, or Firm* — Harness, Dickey & Pierce, P.L.C.

(57) ABSTRACT

A wheel bearing apparatus has a magnetic encoder 14 mounted on an inner ring 5 opposing the rotational speed sensor 16, via the cap 10 and an air gap. The cap 10 has a cylindrical fitting part 10a press-fit into an inner circumference of an end of the outer member 2. A shielding part 10c extends radially inward from the fitting part 10a and has an annular disc shape. A detection part 16a of the rotational speed sensor 16 is arranged close to or in contact with a side surface of the shielding part 10c. The cap 10 is formed of austenitic stainless steel sheet based on SUS 304. The carbon (C) content is reduced and the nickel (Ni) content is increased. A difference of magnetic flux density between a martensitic transformation part and non-martensite part is 1.4 mT or less.

4 Claims, 4 Drawing Sheets

(51) Int. Cl.
  *F16C 41/00* (2006.01)
  *F16C 33/72* (2006.01)
  *B60B 27/00* (2006.01)
  *B60B 35/02* (2006.01)
  *F16C 33/76* (2006.01)
(52) U.S. Cl.
  CPC .......... *F16C 33/723* (2013.01); *F16C 33/768* (2013.01); *F16C 33/783* (2013.01); *F16C 41/007* (2013.01); *B60B 27/0068* (2013.01); *B60B 27/0073* (2013.01); *F16C 33/7813* (2013.01); *F16C 2226/30* (2013.01); *F16C 2233/00* (2013.01); *F16C 2326/02* (2013.01); *Y02T 10/86* (2013.01); *Y02T 10/865* (2013.01)
(58) Field of Classification Search
  CPC .............. F16C 33/7813; F16C 33/7833; F16C 2226/30; F16C 2233/00; F16C 2326/02; F16C 33/121; F16C 19/08; B60B 27/0073; B60B 27/0068; Y02T 10/86; Y02T 10/865
  USPC .......................... 384/448, 489, 537, 544, 564
  See application file for complete search history.

(56) References Cited

FOREIGN PATENT DOCUMENTS

| | | | | |
|---|---|---|---|---|
| JP | 2011-196425 | | 10/2011 | |
| JP | 2011196425 A | * | 10/2011 | ........... B60B 27/005 |
| JP | 2012-066661 | | 4/2012 | |
| JP | 2012-177170 A | | 9/2012 | |
| JP | 5334823 B2 | * | 11/2013 | ........... B60B 7/0013 |
| JP | 2014-214765 A | | 11/2014 | |
| JP | 6114604 B2 | * | 4/2017 | ........... F16C 41/007 |
| WO | WO-2011115252 A1 | * | 9/2011 | ........... B60B 27/005 |

* cited by examiner

WHEEL BEARING APPARATUS

CROSS-REFERENCE TO RELATED APPLICATIONS

This application is a continuation of International Application No. PCT/JP2016/077929, filed Sep. 23, 2016, which claims priority to Japanese Application No. 2015-188613, filed Sep. 25, 2015. The disclosures of the above applications are incorporating herein by reference.

FIELD

The present disclosure generally relates to a wheel bearing apparatus that rotationally supports a wheel of a vehicle, such as an automobile, with respect to a suspension apparatus and, more particularly, to a wheel bearing apparatus with a rotational speed sensor to detect a rotation speed of a vehicle wheel.

BACKGROUND

It is generally known that a wheel bearing apparatus rotationally supports a wheel of vehicle with respect to a suspension apparatus incorporates a rotational speed detecting apparatus to detect a rotation speed of a wheel of vehicle to control the anti-lock braking system (ABS). Heretofore, such a wheel bearing apparatus has a sealing apparatus arranged between inner and outer members that are relative rotated, via rolling elements. A magnetic encoder with magnetic poles alternately arranged along its periphery and is integrated with the sealing apparatus. A rotational speed sensor is arranged opposite to the magnetic encoder to detect variation of the magnetic poles of the magnetic encoder according to rotation of a wheel of a vehicle.

In general, the rotational speed sensor is mounted on a knuckle of a suspension apparatus after the wheel bearing apparatus has been mounted on the knuckle. However, in a recent wheel bearing apparatus, it has proposed that the rotational speed sensor is incorporated into the wheel bearing apparatus in order to eliminate complicated work of adjusting an air gap between the rotational speed sensor and the magnetic encoder to reduce the size of the wheel bearing apparatus.

Figure 4:
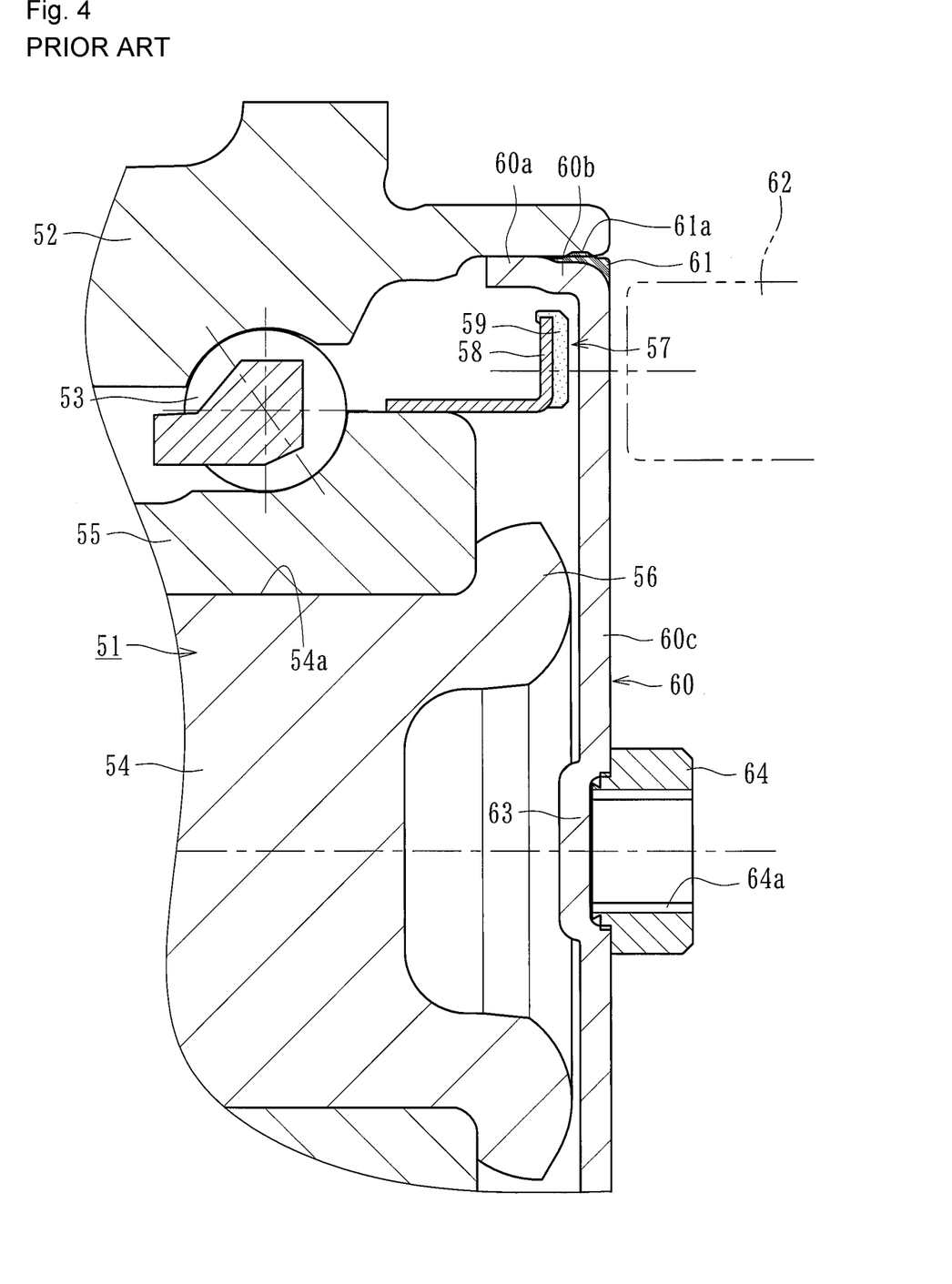
FIG. 4 is a longitudinal-section view of a prior art wheel bearing apparatus with a rotational speed sensor.

FIG. 4 is one example of the wheel bearing apparatus. This wheel bearing apparatus comprises an inner member 51, an outer member 52, and double row balls 53, 53 accommodated between the inner and outer members 51, 52. The inner member 51 comprises a wheel hub 54 and an inner ring 55 press-fit onto the wheel hub 54 via a predetermined interference. The inner ring 55 is press-fit onto a cylindrical part 54a of the wheel hub 54 and axially secured thereto by a caulked part 56 formed by plastically deforming an end of the cylindrical part 54a.

A pulser ring 57 is press-fit onto an outer circumference of the inner ring 55. The pulser ring 57 comprises a supporting annulus 58 and a magnetic encoder 59 adhered by vulcanized adhesion to a side surface of the supporting annulus 58.

A cap 60 is fit into an opening of an annular space formed between the outer member 52 and the inner ring 55 to prevent leakage of grease filled in the bearing and entering of rain water or dusts from the outside.

The cap 60 is securely press-fit into an inner-side end of the outer member 52 to close an opening of the outer member 52. The cap 60 is press-formed of austenitic stainless steel sheet as having a cup-shape and comprises a cylindrical fitting part 60a to be press-fit into an inner circumference of an end of the outer member 52 and a bottom part 60c extending radially inward from the fitting part 60a via a radially reduced part 60b to cover the end of the inner member 51.

An elastic member 61 formed of synthetic rubber such as NBR (acrylonitrile-butadiene rubber) is integrally adhered by vulcanized adhesion to an outer circumference of the radially reduced part 60b of the cap 60. The elastic member 61 is adhered to the cap 60 so that it does not project to the inner-side from the side surface of the bottom part 60c of the cap 60 so as not to interfere the rotational speed sensor 62 and the elastic member 61 has an annular projection 61a projected from an outer circumference of the fitting part 60a. The annular projection 61a can be elastically deformed against the inner circumference of the end of the outer member 52 to improve the sealability of fitting part 60a when the cap 60 is fit into the outer member 52.

A nut 64 is securely pressed into a circular recess 63 formed at the center of the bottom part 60c of the cap 60. The rotational speed sensor 62 can be secured on the cap 60 by fastening s securing bolt to a female thread 64a via a mounting flange (not shown). This enables the rotational speed sensor 62 to be smoothly secured without causing an eccentric torque on the cap 60 when fastening the securing bolt.

The rotational speed sensor 62 is arranged closely to or contacted with a side surface of the bottom part 60c of the cap 60 at a position corresponding to the magnetic encoder 59. The wheel speed can be detected by detecting the variation of magnetic flux of the magnetic encoder 59 with the rotational speed sensor 62 via the bottom part 60c of the cap 60. This makes it possible to obtain a desirable air gap and thus to improve the assembling workability of the rotational speed sensor 62 without complicated air gap adjustment as well as to provide a wheel bearing apparatus with a rotational speed detecting apparatus which can secure the sealability without adversely affecting the sensing performance since the magnetic encoder 59 is sealed by the cap 60 (see e.g., JP 2011-196425 A).

In such a wheel bearing apparatus with a rotational speed detecting apparatus of the prior art, since the elastic member 61 is integrally adhered by vulcanized adhesion to an outer circumference of the radially reduced part 60b of the cap 60 and the elastic member 61 has an annular projection 61a projected from an outer circumference of the fitting part 60a, it is superior that the annular projection 61a can be elastically deformed against the inner circumference of the end of the outer member 52 to improve the sealability of fitting part 60a when the cap 60 is fit into the outer member 52.

However, it is believed that, in the wheel bearing apparatus of the prior art, the cap 60 would interfere with the magnetic encoder 59 since the radially reduced part 60b of the cap 60 on which the elastic member 61 is adhered is positioned at a substantially same axial position as that of the supporting annulus 58 on which the magnetic encoder 59 is adhered. Accordingly, it is necessary to increase the outer diameter of the cap 60 or reduce the outer diameter of the supporting annulus 58 in order to avoid the interference between the magnetic encoder 59 and the cap 60, but this limits the freedom of design.

In addition, the cap 60 is press-formed of non-magnetic austenitic stainless steel sheet such as SUS 304 as having a cup-shape so as to have the corrosion resistance and prevent adverse effect on the sensing performance of the rotational speed sensor 62. However, the austenitic stainless steel sheet of this kind has property that its metallic structure tends to be martensitic transformed especially in a largely bent region when it is press-drawn from a steel sheet to the cup-shape and therefore transforms from a non-magnetic member to a magnetic body. Thus, the bent region would be magnetized by magnetism from the outside and it is believed that the sensing performance of the rotational speed sensor 62 would be adversely affected. More particularly, although the steel sheet is not necessarily magnetized with martensitic transformation alone, it is sometimes magnetized due to the transformation of the cap 60 to a magnetic body when the cap 60 is approached to surrounding magnetized components such as dies or tools.

Although it is possible to neglect influences to the sensing performance caused by transformation of the cap 60 to magnetic body when the magnetic force of the magnetic encoder 59 has sufficient allowance relative to the detection limit of the rotational speed sensor 62, the influence to the sensing performance cannot be neglected when the magnetic encoder 59 does not have sufficient allowance relative to the detection limit of the rotational speed sensor 62, i.e. when the magnetic force of the magnetic encoder 59 itself is small or when the air gap between the magnetic encoder 59 and the rotational speed sensor 62 is large.

SUMMARY

It is, therefore, an object of the present disclosure to solve the problems of the prior art. The present disclosure provides a wheel bearing apparatus with a rotational speed sensor of a type where the rotational speed sensor is arranged at a position corresponding to the magnetic encoder close to or in contact with a side surface of the cap. The cap is formed of austenitic stainless steel sheet based on SUS 304 by a press-drawing method. The cap does not cause an adverse effect to the sensing performance of the rotational speed sensor. This improves the reliability of the rotational speed sensor while securing the desired detection accuracy relative to the detection limit of the rotational speed sensor.

To achieve the above object, a wheel bearing apparatus comprises an outer member integrally formed with double row outer raceway surfaces on its inner circumference. An inner member includes a wheel hub and at least one inner ring. The wheel hub is integrally formed with a wheel mounting flange on its one end and it has an axially extending cylindrical part. The inner ring is press fit onto the cylindrical part of the wheel hub. The inner member outer circumference includes double row inner raceway surfaces that oppose the double row outer raceway surfaces. Double row rolling elements are accommodated between the inner raceway surfaces and outer raceway surfaces, respectively, of the inner member and outer member. A magnetic encoder is mounted on the outer circumference of the inner ring. A cap is fit into an inner-side end of the outer member to seal an annulus opening formed by the outer member and the inner ring. A rotational speed sensor opposes the magnetic encoder via the cap and an air gap. The cap is formed in a cup-shape with a cylindrical fitting part press-fit into an inner circumference of an end of the outer member. A shielding part extends radially inward from the fitting part. It has an annular disc shape. A detection part, of the rotational speed sensor, is arranged close to or in contact with a side surface of the shielding part. The cap is formed of austenitic stainless steel sheet based on SUS 304 where its carbon (C) content is reduced and its nickel (Ni) content is increased. A difference of magnetic flux density between a martensitic transformation part and non-martensite part is 1.4 mT or less.

The wheel bearing apparatus includes a magnetic encoder mounted on the outer circumference of the inner ring. A cap is fit into an inner-side end of the outer member to seal an annulus opening formed by the outer member and the inner ring. A rotational speed sensor opposes the magnetic encoder, via the cap and an air gap. The cap is formed in a cup-shape with cylindrical fitting part press-fit into an inner circumference of an end of the outer member. A shielding part extends radially inward from the fitting part. It has an annular disc shape. A detection part, of the rotational speed sensor, is arranged close to or in contact with a side surface of the shielding part. The cap is formed of austenitic stainless steel sheet based on SUS 304 where its carbon (C) content is reduced and its nickel (Ni) content is increased. A difference of magnetic flux density between a martensitic transformation part and non-martensite part is 1.4 mT or less. Thus, it is possible to suppress the martensitic transformation of the metallic structure after press-drawing of the bent part of the cap having a large machine working degree. Thus, this suppresses the residual magnetic flux density even if the magnetic encoder is arranged at a position near the bent part of the cap. Accordingly, it is possible to provide a wheel bearing apparatus with improved reliability while securing the desired detection accuracy relative to the detection limit of the rotational speed sensor.

The C content of the steel sheet being blanked into the cap is set at 0.030 wt % or less and the Ni content is set at 9.00 to 13.00 wt %. This improves the processability, secure the austenitic stability, and suppress the martensitic transformation of the metallic structure after press-drawing of the bent part of the cap having a large machine working degree.

The sheet thickness of the cap is 0.2 to 1.0 mm. This makes it possible to accurately form the shape of the cap and to have sufficient strength and rigidity. In addition, it is also possible to prevent the reduction of detecting accuracy due to an increase of the air gap and suppress the martensitic transformation due to an increase of working degree during formation of the cap.

The cap further comprises a radially reduced part formed at an end of the fitting part. The shielding part extends radially inward from the radially reduced part. A bottom part extends from the shielding part, via a cylindrical part, to close the inner-side end of the inner member. A sealing member, of synthetic rubber, is secured on an outer circumference of the radially reduced part. The sealing member includes an annular part and an annularly projected part projecting radially outward from the annular part. An outer diameter of the annular part is smaller than that of the fitting part of the cap. An outer diameter of the annularly projected part is larger than that of the fitting part of the cap. Thus, the annularly projected part can be pressed against the inner circumference of the outer member. This improves the sealability of fitting surface of the cap and allows the annular part to form a margin space where elastic material of the annularly projected part can flow when the annularly projected part is compressed during fitting of the cap. Thus, this prevents the sealing member from projecting from an end face of the outer member and being damaged. Accordingly, this further improves sealability.

The wheel bearing apparatus of the present disclosure includes an outer member integrally formed, on its inner circumference, with double row outer raceway surfaces. An inner member includes a wheel hub and at least one inner ring. The wheel hub is integrally formed, on its one end, with a wheel mounting flange and has an axially extending cylindrical part. The inner ring is press fit onto the cylindrical part of the wheel hub. The inner member outer circumference includes double row inner raceway surfaces opposing the double row outer raceway surfaces. Double row rolling elements are accommodated between the inner raceway surfaces and outer raceway surfaces, respectively, of the inner member and outer member. A magnetic encoder is mounted on the outer circumference of the inner ring. A cap is fit into an inner-side end of the outer member to seal an annulus opening formed by the outer member and the inner ring. A rotational speed sensor opposes the magnetic encoder, via the cap and an air gap. The cap is formed in a cup-shape with a cylindrical fitting part press-fit into an inner circumference of an end of the outer member. A shielding part extends radially inward from the fitting part. It has an annular disc shape. A detection part, of the rotational speed sensor, is arranged close to or in contact with a side surface of the shielding part. The cap is formed of austenitic stainless steel sheet based on SUS 304 where its carbon (C) content is reduced and its nickel (Ni) content is increased. A difference of magnetic flux density between a martensitic transformation part and non-martensite part is 1.4 mT or less. Thus, it is possible to suppress the martensitic transformation of the metallic structure after press-drawing of the bent part of the cap having a large machine working degree. Thus, this suppresses the residual magnetic flux density even if the magnetic encoder is arranged at a position near the bent part of the cap. Accordingly, the wheel bearing apparatus has improved reliability while securing the desired detection accuracy relative to the detection limit of the rotational speed sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The present disclosure is a wheel bearing apparatus comprising an outer member integrally formed on its outer circumference with a body mounting flange. Its inner circumference includes double row outer raceway surfaces. An inner member includes a wheel hub and an inner ring. The wheel hub is integrally formed on its one end with a wheel mounting flange. One inner raceway surface, opposing one of the double row outer raceway surfaces, is also formed on the wheel hub. A cylindrical part axially extends from the inner raceway surface. The inner ring is press fit onto the cylindrical part of the wheel hub. The inner ring is formed with the other inner raceway surface opposing the other of the double row outer raceway surfaces. Double row rolling elements are accommodated between the inner raceway surfaces and outer raceway surfaces, respectively, of the inner member and outer member. A magnetic encoder is mounted on the outer circumference of the inner ring. A cap is fit into an inner-side end of the outer member to seal an annulus opening formed by the outer member and the inner ring. A rotational speed sensor opposes the magnetic encoder via the cap and an air gap. The cap is formed into a cup-shape so that it has a cylindrical fitting part that is press-fit into an inner circumference of an end of the outer member. A shielding part extends radially inward from the fitting part and has an annular disc shape. A detection part of the rotational speed sensor is arranged close to or in contact with a side surface of the shielding part. The cap is formed of austenitic stainless steel sheet based on SUS 304 in which the C content is set at 0.030 wt % or less and the Ni content is set at 9.00 to 13.00 wt %. A difference of magnetic flux density between a martensitic transformation part and non-martensite part is set at 1.4 mT or less.

A preferred embodiment of the present disclosure will be described with reference to the accompanied drawings.

Figure 1:
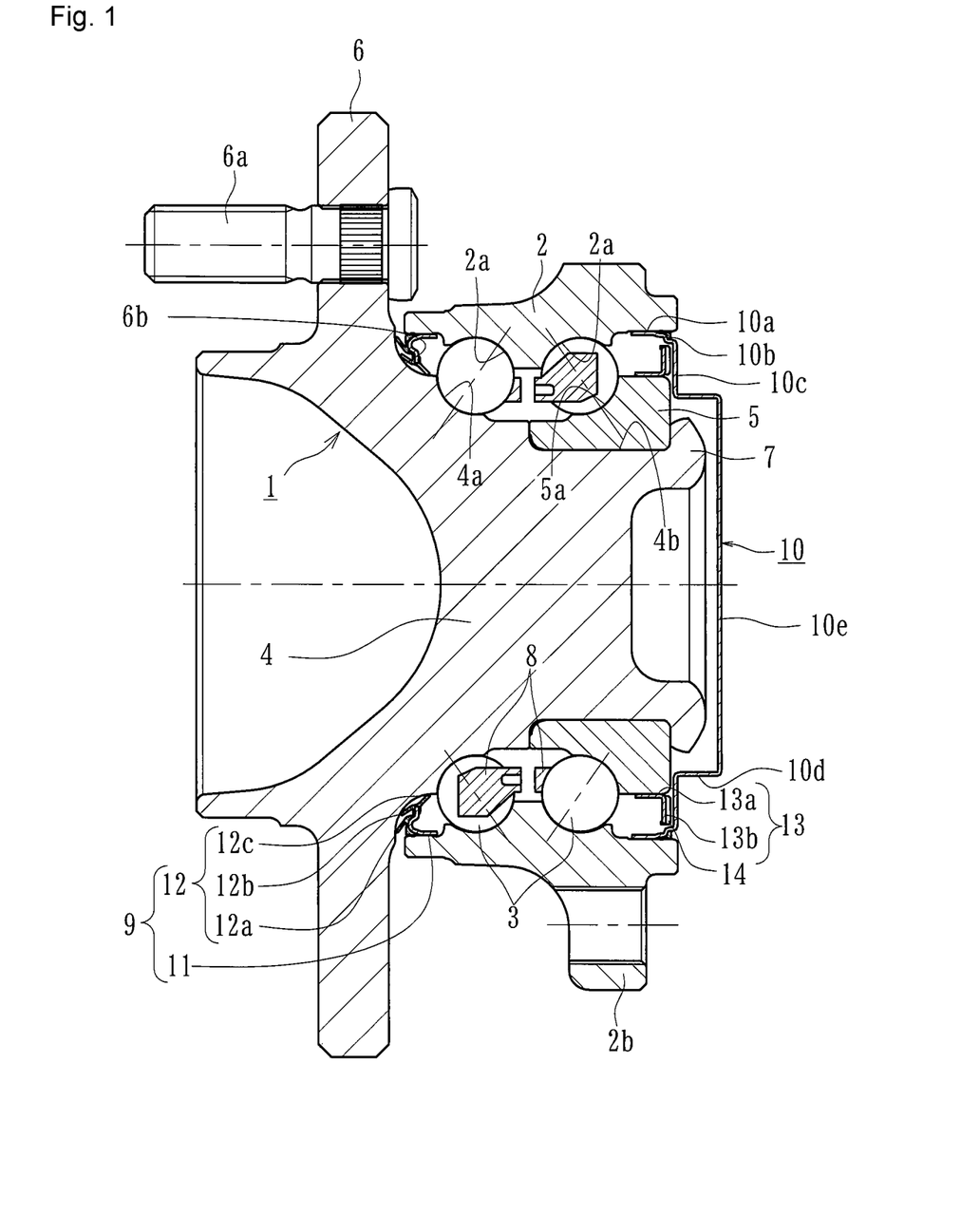
FIG. 1 is a longitudinal-section cross-view of an embodiment of a wheel bearing apparatus of the present disclosure.
Figure 2A:
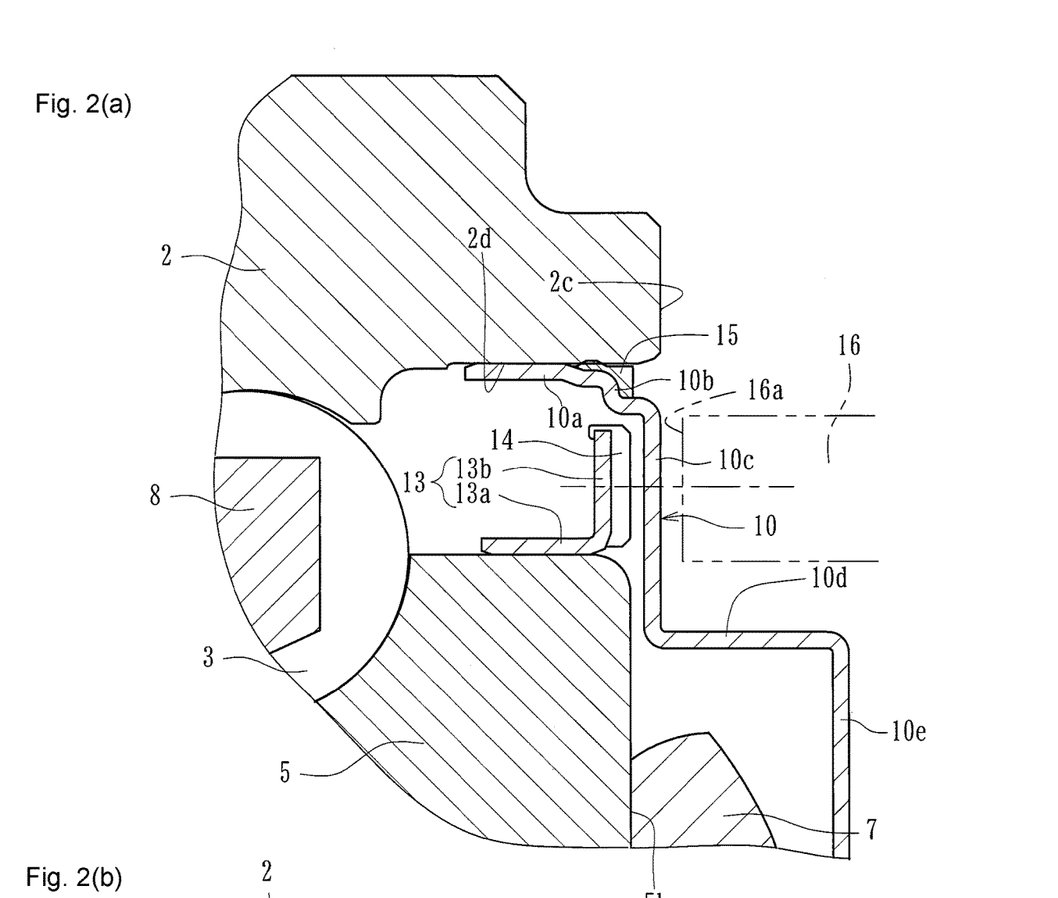
FIG. 2(a) is a partially enlarged view of FIG. 1.
Figure 2B:
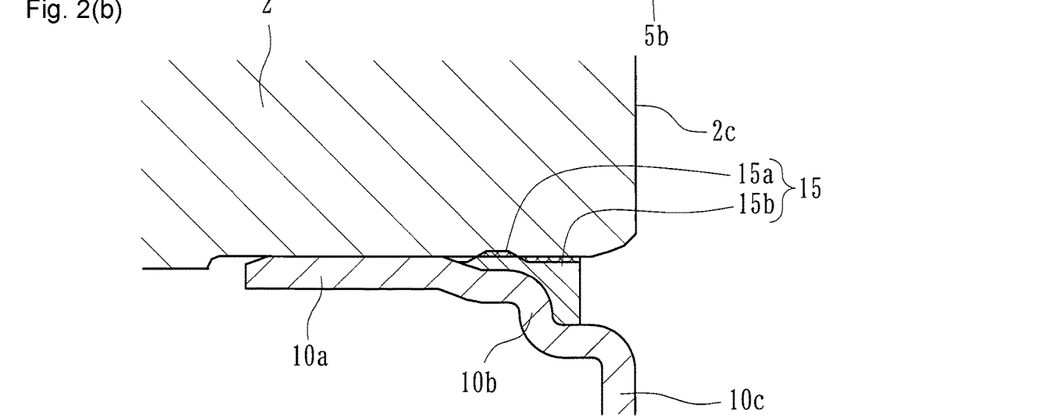
FIG. 2(b) is a partially enlarged view of FIG. 2(a).
Figure 3:
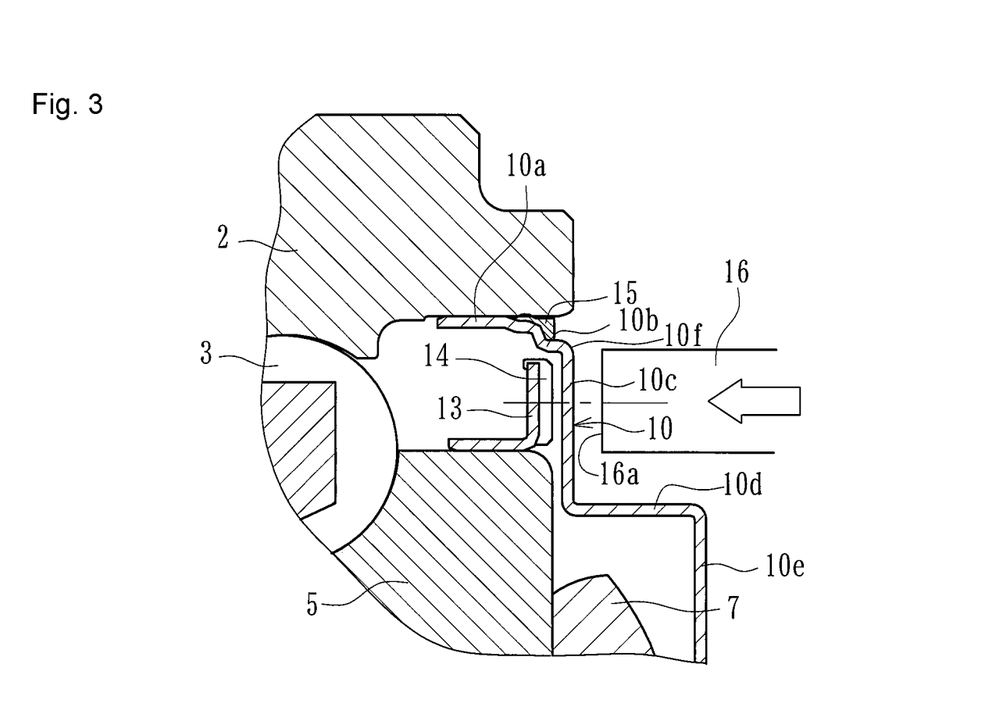
FIG. 3 is an explanatory view of a method for measuring the residual magnetic flux density.

FIG. 1 is a longitudinal-section view of one embodiment of a wheel bearing apparatus with a rotational speed sensor. FIG. 2(a) is a partially enlarged view of FIG. 1. FIG. 2(b) is a partially enlarged view of FIG. 2(a). FIG. 3 is an explanatory view of a method for measuring the residual magnetic flux density. In descriptions below, the side that is positioned on the outer side of a vehicle body, when the wheel bearing apparatus is mounted on a vehicle, is referred to as "outer-side" (left side in drawings). The side that is positioned inside of the vehicle body is referred to as "inner-side" (right side in drawings).

The wheel bearing apparatus shown in FIG. 1 is a so-called "third generation" type for a driven wheel. It includes an inner member 1, an outer member 2 and double row rolling elements (balls) 3, 3 accommodated between the inner and outer members 1 and 2. The inner member 1 includes a wheel hub 4 and an inner ring 5. The inner ring 5 is press-fit onto the wheel hub 4, via a predetermined interference.

Outer member 2 is formed of medium-high carbon steel such as S53C including carbon of 0.40 to 0.80 wt %. Its outer circumference is formed with body mount flange 2b adapted to be mounted onto a knuckle (not shown). Its inner circumference is formed with double row outer raceway surfaces 2a, 2a. The double row outer raceway surfaces 2a, 2a are hardened by high frequency induction hardening to have a surface hardness of 58 to 64 HRC.

The wheel hub 4 is integrally formed, on its outer-side end, with a wheel mount flange 6, to mount a wheel (not shown). Hub bolts 6a are secured on the wheel mounting flange 6 at circumferentially equidistant positions. In addition, the wheel hub 4 is formed, on its outer circumference, with one (outer-side) inner raceway surface 4athat opposes one of the double row outer raceway surfaces 2a, 2a. A cylindrical part 4b axially extends from the inner raceway surface 4a.

The inner ring 5 is formed with an inner raceway surfaces 5a on its outer circumference. The inner raceway surface 5a opposes the other (inner-side) double row outer raceway surfaces 2a, 2a. The inner ring 5 is press-fit onto the cylindrical part 4b of the wheel hub 4, via a predetermined interference. The inner ring 5 is axially secured on the wheel hub 4 by a caulked part 7. The caulked part is formed by plastically deforming the end of the cylindrical part 4b radially outward, in a state, where a predetermined bearing pre-pressure is applied.

The double row rolling elements 3, 3, rollably held by cages 8, 8, are accommodated between the double row outer raceway surfaces 2a, 2a of the outer member 2 and the double row inner raceway surfaces 4a, 5a, opposing them. Annular openings are formed between the outer member 2 and the inner member 1. A seal 9 is mounted on the outer-side opening. A cap 10 is mounted on the inner-side opening. The seal 9 and cap 10 prevent leakage of lubricating grease sealed within the bearing and entry of rain water or dust from the outside into the bearing.

Although the wheel bearing apparatus shown here is formed by a double row angular contact ball bearing using balls as rolling elements 3, the present disclosure is not limited to such a bearing and may be a double row tapered roller bearing using tapered rollers as the rolling elements 3. In addition, the bearing is shown here as a third generation type, the present disclosure can be applied to first and second generation type bearings (not shown) where a pair of inner rings is press-fit onto the wheel hub.

The wheel hub 4 is made of medium-high carbon steel such as S53C including carbon of 0.40 to 0.80 wt %. It is hardened by high frequency induction hardening to have a surface hardness of 58 to 64 HRC. The hardening is over the inner raceway surface 4a and a region from an inner-side base 6b of the wheel mounting flange 6 to the cylindrical part 4b. The caulked part 7 is not hardened and kept to hardness after forging. This improves not only the frictional resistance of the base 6b forming a seal land part of the seal 9 but the durability of the wheel hub 4. Thus, the mechanical strength against the rotary bending load applied to the wheel mounting flange 6 can be also improved. In addition, this makes it possible to make the caulking work easier and to prevent the generation of micro cracks during machining.

The inner ring 5 and the rolling elements 3 are formed of high carbon chrome bearing steel such as SUJ2. The inner ring 5 is dip hardened to its core to have a hardness of 58 to 64 HRC. The rolling elements 3 are also dip hardened to their cores to have a hardness of 62 to 67 HRC.

Seal 9 includes a metal core 11 press-fit into the outer-side end of the outer member 2, via a predetermined interface. A sealing member 12 is adhered to the metal core 11 to form an integrated seal. The metal core 11 is formed of austenitic stainless steel sheet (e.g. JIS SUS 304 etc.), cold rolled steel sheet (e.g. JIS SPCC etc.) or ferritic stainless steel sheet (e.g. JIS SUS 430 etc.). It is press-formed to have an L-shaped cross section.

The sealing member 12 is formed of synthetic rubber such as NBR (acrylonitrile-butadiene rubber). It is integrally adhered to the metal core 11, via vulcanized adhesion. The sealing member 12 includes a pair of side lips 12a, 12b and a grease lip 12c. The side lips 12a, 12b are inclined radially outward and are in sliding contact, via a predetermined axial interference, with the inner-side base 6b of the wheel mounting flange 6, having a circular arc cross-section. The grease lip 12c is inclined toward the inner-side of the wheel bearing.

A generally annular supporting annulus 13, with an L-shaped cross-section, is press-fit onto the outer circumference of the inner ring 5. As clearly shown in the enlarged view of FIG. 2(a), the supporting annulus 13 includes a cylindrical part 13a and a standing part 13b. The cylindrical part 13a is press-fit onto the outer circumference of a larger diameter side of the inner ring 5. The standing part 13b extends radially outward from the cylindrical part 13a. A magnetic encoder 14 is integrally adhered to the inner-side surface of the standing part 13b, via vulcanizing adhesion. The magnetic encoder 14 is formed from an elastomer, such as rubber, that includes mingled ferritic magnetic powder so that N and S poles are alternately arranged along its circumference to form a rotary encoder.

The annular supporting annulus 13 is formed of a ferromagnetic steel plate such as ferritic stainless steel sheet (e.g. JIS SUS 430 etc.) or preserved cold rolled steel sheet by press working. Accordingly, it is possible to prevent the generation of corrosion on the supporting annulus 13 as well as to assure a strong magnetic output of the magnetic encoder 14 to have a stable detecting accuracy.

A cap 10 is mounted on the inner-side end of the outer member 2. The cap 10 is formed from austenitic stainless steel sheet to have a cup shape. It comprises a cylindrical fitting part 10a, an annular disc shaped shielding part 10c, a radially reduced part 10b, a bottom part 10e and a cylindrical part 10d. The cylindrical fitting portion 10a is press-fit into an inner circumference 2d of the end of the outer member 2. The annular disc shaped shielding part 10c extends radially inward from the fitting part 10a, via the radially reduced part 10b. The bottom part 10e extends from the shielding part 10c, via the cylindrical part 10d, to close the inner-side end of the inner member 1. The detecting part 16a, of the rotational speed sensor 16, is arranged close to or in contact with the shielding part 10c of the cap 10. The detection part 16a and the magnetic encoder 14 are arranged opposite to each other via a predetermined air gap (axial gap) across the cap 10. Such a stepped cross-section of the cap 10 increases the rigidity of the cap 10. Thus, it suppresses deformation of the cap 10 due to impingement of pebbles etc. and accordingly improves its life for a long term.

The cap 10 has a sheet thickness of 0.2 to 1.0 mm. If the thickness is less than 0.2 mm, the cap 10 could not be accurately formed. Also, the strength and rigidity of the cap 10 would be reduced. Thus, the cap 10 would be deformed during assembly of the wheel bearing apparatus or by pebbles etc. during driving. On the contrary, if the thickness of the cap 10 exceeds 1.0 mm, an air gap would be too large to obtain desirable magnetic properties. Thus, the detection accuracy would be impaired. In addition, the degree of press-formation would be large and the martensitic transformation would be caused in the bending processes of the cap 10 as described later.

According to this embodiment, as shown in FIG. 2(b), the radially reduced part 10b has a stepped cross-section. A sealing member 15 is secured to the outer circumference of the radially reduced part 10b. The sealing member 15 is formed of synthetic rubber such as NBR etc. It includes an annularly projected part 15a and an annular part 15b. It is integrally adhered to the cap 10 by vulcanized adhesion. An outer diameter of the annular part 15b of the sealing member 15 is slightly smaller than that of the fitting part 10a of the cap 10. An outer diameter of the annularly projected part 15a of the sealing member 15 is slightly larger than that of the fitting part 10a of the cap 10. That is, the annularly projected part 15a of the sealing member 15 can be press-fit into the inner circumference 2d of the outer member 2, via a predetermined interference. This improves the sealability between the outer member 2 and the cap 10. The annular part 15b of the sealing member 15 is able to form a margin space where elastic material of the annularly projected part 15a can flow when the annularly projected part 15a is compressed during fitting of the cap 10. Thus, this prevents the sealing member 15 from projecting from an end face 2c of the outer member 2 and being damaged. Accordingly, it is possible to further improve the sealability.

The cap 10 is formed from steel sheet according to the present disclosure shown in Table 2 (Embodiment). It is basically austenitic stainless steel sheet based on JIS SUS 304. However its carbon (C) content is reduced and its nickel (Ni) content is increased compared with conventional austenitic stainless steel sheet (JIS SUS 304, Comparative Example) shown in Table 1.

TABLE 1

| | Components (wt %) | | | | | |
|---|---|---|---|---|---|---|
| | C | Si | Mn | P | S | Ni | Cr |
| Comparative Example SUS 304 | 0.08 or less | 1.00 or less | 2.00 or less | 0.045 or less | 0.030 or less | 8.00 to 10.50 | 18.00 to 20.00 |

TABLE 2

| | Components (wt %) | | | | | |
|---|---|---|---|---|---|---|
| | C | Si | Mn | P | S | Ni | Cr |
| Embodiment | 0.030 or less | 1.00 or less | 2.00 or less | 0.045 or less | 0.030 or less | 9.00 to 13.00 | 18.00 to 20.00 |

Carbon (C): C is an austenite producing element and is thus added in order to secure the austenite stability. However, the content of C is suppressed to 0.030 wt % or less (0% exclusive) since excessive amount of C makes the steel sheet material too hard to maintain its processability.

Silicon (Si): Si is effective as a deoxidizer. However, the content of Si is suppressed to 1.00 wt % or less (0% exclusive) since excessive amount of Si makes the steel sheet material too hard to maintain its productivity.

Manganese (Mn): Mn is an austenite producing element and is thus added in order to secure the austenite stability. This improves the deep-drawing processability. However, the content of Mn is suppressed to 2.00 wt % or less (0% exclusive) since excessive amount of Mn causes formation of MnS and thus impairs the corrosion resistance.

Phosphorus (P): P tends to segregate in austenitic grain boundary when quenching and promote generation of quenching cracks. Accordingly, it is preferable to reduce the content of P as much as possible and thus its content is suppressed to 0.045 wt % or less.

Sulfur (S): S forms MnS in steel and has an effect of improving machinability. Thus, the content of S is set at a value more than 0.010 wt %. However, since MnS tends to cause original points of cracks and thus reduction of the strength and toughness, the upper limit of the content of S is set at 0.030 wt %.

Nickel (Ni): Ni is a component indispensable for austenitic stainless steel. The content of Ni is set at a value of 9.00 wt % or more in order to secure the austenitic stability and productivity. In the present embodiment, the upper limit of the Ni content is set at 13.00 wt % in consideration of economy.

Chromium (Cr): Cr is necessary 15 wt % or more to obtain sufficient corrosion resistance. Thus, the lower limit of Cr content is set at 18.00 wt % or more. On the contrary, since much addition of Cr forms delta ferrite which adversely affects the manufacturability, the upper limit of the content of Cr is set at 20.00 wt %. The composition of the austenitic steel sheet of the present embodiment includes the balance Fe with inevitable impurities.

The applicant of the present disclosure has performed forced magnetization and measured the influence degree to ABS sensing relative to the residual magnetic flux density. Results of the measurement are shown in Table 3 below.

TABLE 3

| | Residual magnetic flux density (mT) | | | | | | | | | |
|---|---|---|---|---|---|---|---|---|---|---|
| | 0 | 0.2 | 0.4 | 0.6 | 0.8 | 1.0 | 1.2 | 1.4 | 1.6 | 1.8 |
| Influence degree | ◎ | ◎ | ◎ | ○ | ○ | ○ | ○ | Δ | X | X |

◎: Hardly influenced to sensing
○: Somewhat influenced to sensing, but practically usable
Δ: Influenced to sensing, but practically usable depending on condition of use.
X: Influenced to sensing and practically unusable The evaluation method will be described with reference to FIG. 3. The radial measurement position is set so that the outer circumference of the detection part 16a of the rotational speed sensor (for the ABS) 16 is positioned at an end part (end part of the bent part i.e. round part 10f) of the radially reduced part 10b of the cap 10. The axial measurement position is set so that the detection part 16a of the rotational speed sensor 16 is positioned at a position 0.5 mm apart from the inner-side surface of the shielding part 10c of the cap 10. The rotational speed sensor 16 includes an IC circuit incorporated with a Hall element and a waveform shaping circuit for shaping the output waveform of the Hall element.

As shown in Table 3, it is found that the sensing is not influenced and practically usable when the saturation value of the residual magnetic flux density brought by the forced magnetization of the cap 10 is 1.4 mT or less (preferably 0.4 mT or less). That is, it is found that when the cap 10 is forcedly magnetized, assuming that a magnetic encoder generating magnetism is arranged near the bent part (fitting part 10a and radially reduced part 10b) in a practical use, the martensitic transformation of metallic structure after press-drawing can be suppressed.

As apparent from the evaluation, the difference of the magnetic flux density between the bent part 10a, 10b, where the metallic structure is martensitic transformed after press-drawing, and the bottom part 10e, that is not press-drawn and its metallic structure is not martensitic transformed, is 1.6 mT or more in the conventional SUS 304 (Comparative Example). To the contrary, it is 1.4 mT or less in the steel sheet according to the present disclosure. Accordingly, the cap 10 according to the present disclosure is able to suppress the residual magnetic flux density to 1.4 mT or less. Thus, it is possible to provide a wheel bearing apparatus, with a rotational speed sensor, that can prevent an adverse effect to the sensing performance of the rotational speed sensor 16 and improve the reliability with securing the desirable detection accuracy relative to the measurement limit of the rotational speed sensor 16.

The present disclosure can be applied to any wheel bearing apparatus of the inner ring rotation type, with a rotational speed detecting apparatus, including a cap mounted on the inner-side end of the outer member. The bearing apparatus uses rolling elements such as balls or tapered rollers.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:

an outer member integrally formed with double row outer raceway surfaces on its inner circumference;

an inner member including a wheel hub and at least one inner ring, the wheel hub integrally formed with a wheel mounting flange on its one end and having an axially extending cylindrical part, the inner ring press fit onto the cylindrical part of the wheel hub, the inner member formed, on its outer circumference, with double row inner raceway surfaces opposing the double row outer raceway surfaces;

double row rolling elements accommodated between the inner raceway surfaces and outer raceway surfaces, respectively, of the inner member and outer member;

a magnetic encoder mounted on the outer circumference of the inner ring;

a cap fit into an inner-side end of the outer member to seal an annulus opening formed by the outer member and the inner ring;

a rotational speed sensor opposing the magnetic encoder via the cap and an air gap;

the cap formed into a cup-shape so that it has a cylindrical fitting part press-fit into an inner circumference of an end of the outer member, a shielding part extends radially inward from the fitting part and has an annular disc shape, a detection part of the rotational speed sensor arranged close to or in contact with a side surface of the shielding part; and the cap is formed of austenitic stainless steel sheet based on SUS 304 with a reduced carbon (C) content and an increased nickel (Ni) content, and a difference of magnetic flux density between a martensitic transformation part and non-martensite part is 1.4 mT or less.

2. The wheel bearing apparatus of claim 1, wherein the C content of the steel sheet being a blank of the cap is set at 0.030 wt % or less and the Ni content is set at 9.00 to 13.00 wt %.

3. The wheel bearing apparatus of claim 1, wherein the sheet thickness of the cap is 0.2 to 1.0 mm.

4. The wheel bearing apparatus of claim 1, wherein the cap further comprises a radially reduced part, a shielding part, bottom part and cylindrical part, the radially reduced part formed at an end of the fitting part, the shielding part extending radially inward from the radially reduced part, and the bottom part extending from the shielding part via the cylindrical part for closing the inner-side end of the inner member; and wherein a sealing member, of synthetic rubber, is secured on an outer circumference of the radially reduced part, the sealing member comprising an annular part and an annularly projected part projecting radially outward from the annular part, an outer diameter of the annular part being smaller than that of the fitting part of the cap, an outer diameter of the annularly projected part being larger than that of the fitting part of the cap so that the annularly projected part can be pressed against the inner circumference of the outer member.

* * * * *

UNITED STATES PATENT AND TRADEMARK OFFICE
CERTIFICATE OF CORRECTION

PATENT NO. : 10,641,336 B2  Page 1 of 1
APPLICATION NO. : 15/933467
DATED : May 5, 2020
INVENTOR(S) : Hiroto Suma It is certified that error appears in the above-identified patent and that said Letters Patent is hereby corrected as shown below:

In the Specification

<u>Column 6</u>
Line 52    "4$a$that" should be --4$a$ that--

Signed and Sealed this
First Day of September, 2020

Andrei Iancu
*Director of the United States Patent and Trademark Office*